US008903066B1

(12) United States Patent
Orr et al.

(10) Patent No.: US 8,903,066 B1
(45) Date of Patent: Dec. 2, 2014

(54) PORTABLE SYSTEM FOR INSTITUTIONAL TELEPHONE SERVICE PROVISION

(71) Applicant: Confinement Telephony Technology, LLC, Greensboro, NC (US)

(72) Inventors: Charles David Orr, Burlington, NC (US); Jason Adam Reynolds, High Point, NC (US); Todd Russell Thomasson, Elon, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 0 days.

(21) Appl. No.: 13/735,280

(22) Filed: Jan. 7, 2013

Related U.S. Application Data

(60) Provisional application No. 61/583,419, filed on Jan. 5, 2012.

(51) Int. Cl.
*H04M 3/00* (2006.01)
*H04M 1/667* (2006.01)

(52) U.S. Cl.
CPC .................................... *H04M 1/667* (2013.01)
USPC .................... 379/189; 379/201.12; 379/32.01

(58) Field of Classification Search
CPC . H04M 1/72519; H04M 3/22; H04M 3/2272; H04M 3/2281
USPC .......... 379/32.01, 32.04, 35, 188, 189, 32.05, 379/196; 370/352, 401
See application file for complete search history.

(56) References Cited

U.S. PATENT DOCUMENTS 7,899,167 B1 * 3/2011 Rae ............................... 379/189
2011/0296537 A1 * 12/2011 Wood et al. ..................... 726/35

* cited by examiner

*Primary Examiner* — Antim Shah
(74) *Attorney, Agent, or Firm* — Kilpatrick Townsend & Stockton LLP

(57) ABSTRACT

One exemplary embodiment provides a device comprising: a connection panel configured to accept a removable connection to a telephone of a controlled access residential institution; a network router connected to the connection panel and configured to connect to a remote network; and an access and security module connected to the network router and configured to control access by the telephone to telephone services provided by accessing a remote call processing center via the remote network. The connection panel, the network router, and access and security module can be at least partially enclosed within a portable enclosure. The device may further comprise a power distribution unit within the enclosure and connected to provide power to the network router and to the access and security module.

19 Claims, 5 Drawing Sheets

PORTABLE SYSTEM FOR INSTITUTIONAL TELEPHONE SERVICE PROVISION

RELATED APPLICATIONS

This application claims the benefit of U.S. Provisional Application No. 61/583,419 filed on Jan. 5, 2012 and entitled "Portable System for Institutional Telephone Service Provision," which is incorporated herein in its entirety by this reference.

FIELD OF THE INVENTION

The present invention relates to the provision of telephone services to the residents of a controlled access residential institution.

BACKGROUND OF THE INVENTION

In the context of the operation of telecommunication systems which serve residential institutions such as a correctional confinement facility, service providers have traditionally implemented solutions which incorporate various components of a wide array of hardware devices. Most commonly, these hardware components are located in one or more designated "equipment rooms" or "wiring closets" at the residential institution. Typically, the installation of a telecommunication system at the institutional site is a laborious and time-consuming process, involving the installation of semi-permanent equipment, such as floor-mounted racks, and multiple additional hardware components which must be physically installed and wired appropriately. In addition, physical interfaces are required with a network service provider in order to establish the outbound connections to the network from the telecommunication system. In some embodiments, this may take the form of standard telephone lines, while in others it may take the form of T-1, DSL, cable, or other broadband connections. These network interfaces require not only a physical location, but also require coordination and proper timing of the installation with the network service provider, frequently including a waiting period of two to six weeks before the physical installation is available.

In one common example of the limitations imposed by the prior art, when a residential institution elects to change from a first telephone service provider to a second telephone service provider, said second telephone service provider is forced to coordinate closely the logistics of replacing said first telephone service provider, due to physical equipment location requirements, wiring concerns and network interface concerns. Frequently this coordination is hampered either by lack of cooperation on behalf of said first telephone service provider, by inadequate communications between all affected parties, or by scheduling issues which arise with the network service provider in establishing a traditional, "hard-wired" network interface. These conflicts often result in a delay of the transition or in a period of time during which telephone services are unavailable to the institution, either of which causes a loss of revenue for said second telephone service provider. Similarly, in the case of a first-time installation of telephone services for a residential institution—such as would be for newly constructed facilities—delays are frequently encountered with establishing the traditional "hard-wired" network interface. These limitations impair the telephone service provider's ability to act quickly and perform expeditious installations, causing delays and ultimately the loss of revenue.

In another common example of the limitations imposed by the prior art, difficulties are frequently encountered when a telephone service provider wishes to replace or exchange the currently installed telephone service equipment, either due to inoperability of the currently installed equipment or due to the desire to increase functionality, efficiency or features. Additional labor costs are incurred by the telephone service provider and lapses in service frequently result.

In yet another common example of the limitations imposed by the prior art, due to the complex and "hard-wired" nature of traditional systems, telephone service providers are unable to easily demonstrate for potential customers a true and accurate example of a working system. Telephone service provider sales teams are frequently left to rely on printed materials, recorded video demonstrations, and other methods which attempt to demonstrate the product, but none of which is the actual product. Telephone service provider sales teams also frequently offer to the potential customer a "field trip" to visit an already-installed system at an existing location. This alternative, however, creates inconvenience and cost for the potential customer and is limited in its effectiveness as a sales tool.

FIG. 1 is a diagram illustrating a common embodiment of the prior art. Illustrated are an Equipment Room 100 and Resident Telephone Handsets 160, which are located external to Equipment Room 100 and provide a device with which telephone services may be accessed by residents of the institution. Resident Telephone Handsets 160 are connected by wire to Punchdown Block 130, which is then in turn connected by cable to Automated Call Processor 120. Automated Call Processor 120 performs call setup and switching operations between residents and the public switched telephone network (PSTN) and is powered by cables connected to Power Distribution Unit 110. Automated Call Processor 120 is additionally connected by cable to Punchdown Block 140, which is then in turn connected by cable to Wired PSTN Network Interface 150.

FIG. 2 is a diagram illustrating yet another common embodiment of the prior art. Illustrated are an Equipment Room 200 and Resident Telephone Handsets 260, which are located external to Equipment Room 200 and provide a device with which telephone services may be accessed by residents of the institution. Resident Telephone Handsets 260 are connected by wire to Punchdown Block 230, which is then in turn connected to VoIP Gateway 270. VoIP Gateway 270 sends and receives analog audio signals to and from Resident Telephone Handsets 260, and sends and receives digital audio signals to and from Automated Call Processor 220, performing analog-to-digital and digital-to-analog conversions as required. Automated Call Processor 220 is connected by data cable to VoIP Gateway 270, Network Firewall 290, Recording Server 240, and to Resident Information Database Server 250. Automated Call Processor 220 performs call setup functions facilitated by connections to Resident Information Database Server 250. Further, Automated Call Processor 220 performs switching operations between Resident Telephone Handsets 260 and Public Switched Telephone Network (PSTN) 295, facilitated by connections to Network Firewall 290, Network Router 280, Wired Broadband Network Interface 295, and Wide Area Packet Network 275. Still further, Automated Call Processor 240 performs audio recording functions facilitated by connection to Recording Server 240. Power Distribution Unit 210 connects by cable, and provides electrical power, to VoIP Gateway 270, Network Router 280, Network Firewall 290, Automated Call Processor 220, Recording Server 240, and Resident Information Database Server 250.

SUMMARY OF THE INVENTION

One exemplary embodiment provides a device comprising: a connection panel configured to accept a removable connection to a telephone of a controlled access residential institution; a network router connected to the connection panel and configured to connect to a remote network; and an access and security module connected to the network router and configured to control access by the telephone to telephone services provided by accessing a remote call processing center via the remote network. The connection panel, the network router, and access and security module can be at least partially enclosed within a portable enclosure. The device may further comprise a power distribution unit within the enclosure and connected to provide power to the network router and to the access and security module.

Another exemplary embodiment provides a method that involves preconfiguring a portable device at a location remote from a controlled access residential institution. The preconfigured portable device may comprise a connection module configured to connect to an electronic communication device via a wireless or wired connection. The preconfigured portable device may comprise a network router prewired to the connection module and configured to connect to a remote network. The preconfigured portable device may comprise an access and security module prewired to the network router and configured to control access by the electronic communication device to services provided by accessing a remote call processing center via the remote network. The exemplary method involves installing the portable device at the controlled access residential institution to allow the electronic communication device at the controlled access residential institution to access the services provided by accessing the remote call processing center via the remote network. The exemplary method may further involve, while the portable device is providing access, installing a non-portable device and then removing the portable device from the controlled access residential institution.

These exemplary embodiments are provided to introduce the subject matter of the inventive concepts described herein and should not be considered as limiting the scope of the subject matter of this disclosure.

BRIEF DESCRIPTION OF THE DRAWINGS

These and other advantages of illustrative embodiments of the present invention will be apparent to those skilled in the art by reference to the following detailed description and the accompanying drawing figures.

DETAILED DESCRIPTION

Figure 1:
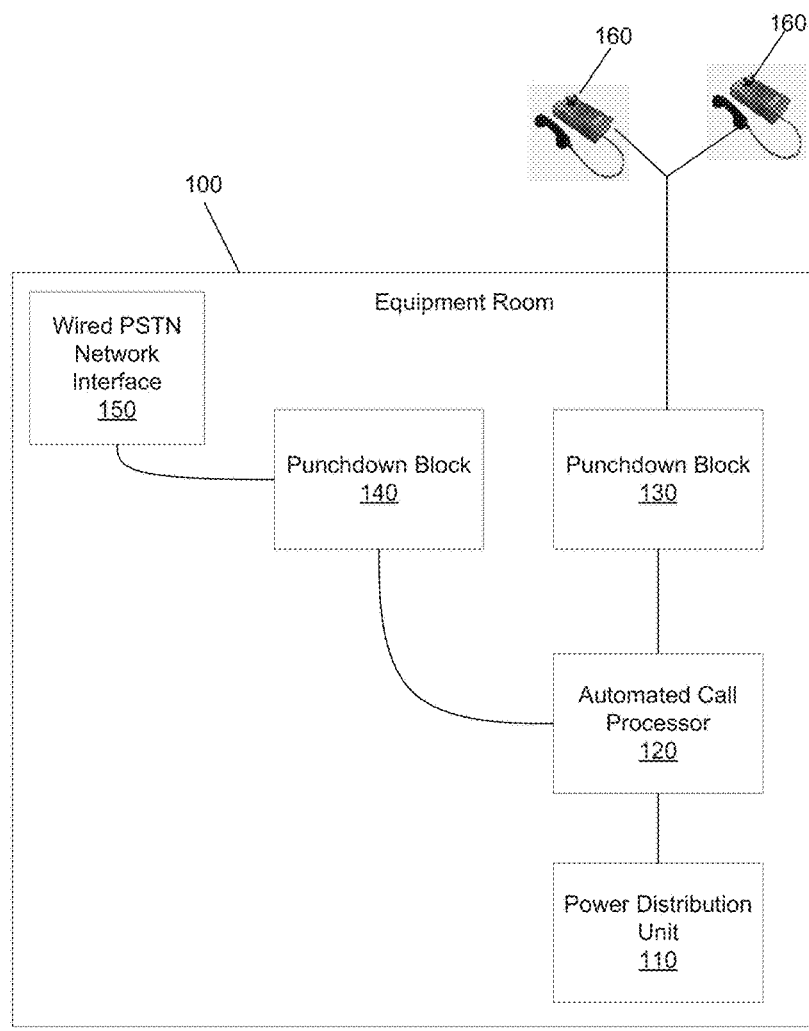
FIG. 1 is a diagram illustrating a prior art equipment room, non-portable system.
Figure 2:
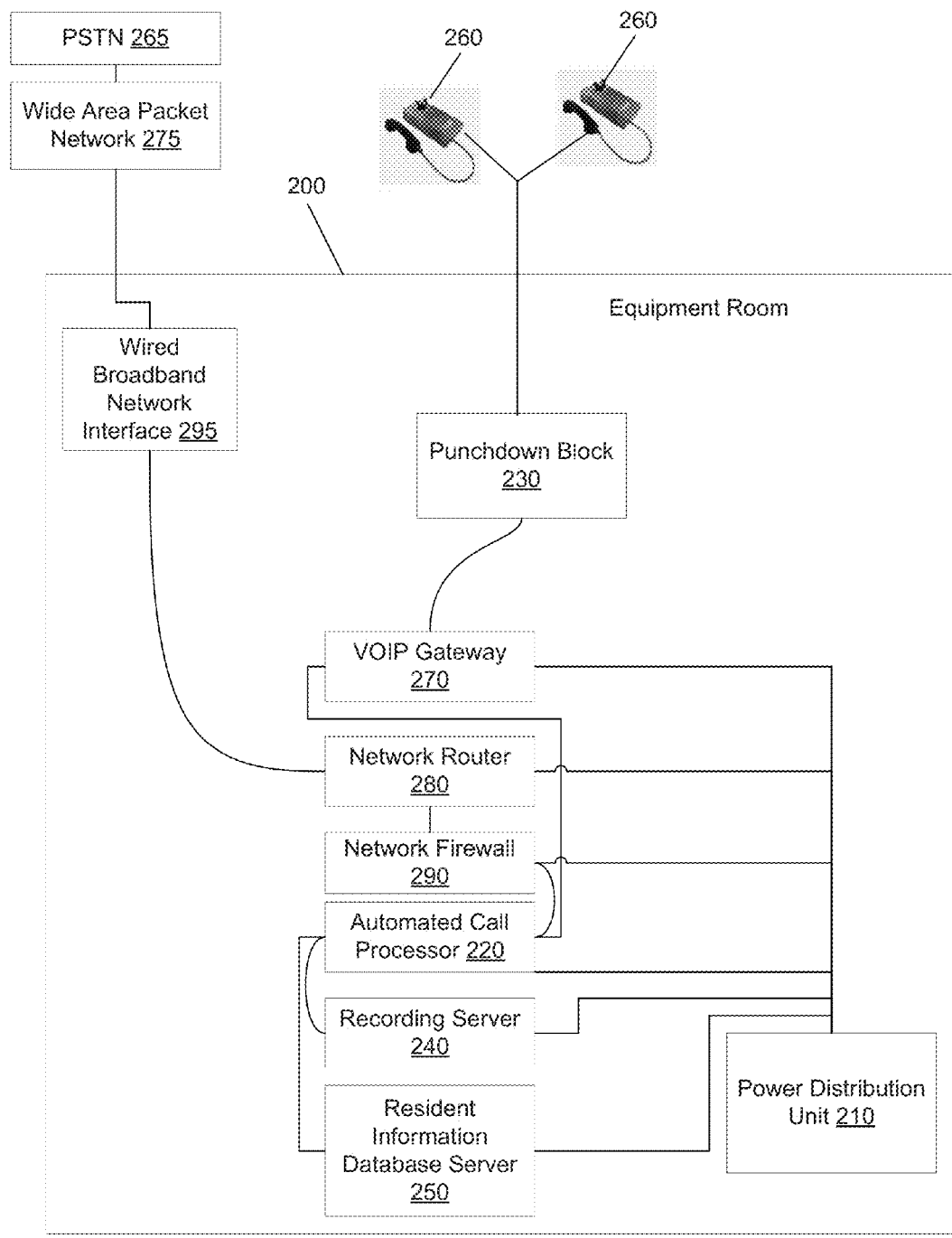
FIG. 2 is a diagram illustrating another common embodiment of a prior art system.

Detailed embodiments are disclosed herein. However, it is to be understood that the disclosed embodiments are merely exemplary and that different embodiments are possible. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the present disclosure.

Systems and methods are provided to overcome the limitations of the prior art. In accordance with one aspect of illustrative embodiments of the present invention, a centralized, off-site call processing system is utilized to perform various functions of telephone services, including but not limited to, call setup, switching, recording, monitoring and billing, along with all other functions commonly associated with providing residential institution telephone services. Connectivity to the off-site call processing system may be achieved through the use of wireless data communications rather than via traditional physical interfaces, such as copper or fiber optic cable-based interfaces, thereby eliminating requirements for a coordinated physical installation of cable-based network interfaces. Wireless data communication connections to the off-site call processing system are accomplished using any of a number of available protocols and interfaces, including, but not limited to, packet-based wireless broadband data networks, such as the well-known 3G and 4G standards utilized by major wireless communications carriers.

In accordance with another aspect of illustrative embodiments of the current invention, a system is provided which advantageously incorporates on-site hardware components into a compact single, pre-wired, portable enclosure. These elements may include, but are not limited to, a power distribution unit, a connection panel for cable management, a network access and security module such as a firewall, a network router, and/or a VoIP gateway. The incorporation of these elements into a single unit, in combination with the utilization of a wireless network interface, removes significant limitations regarding difficulty, simplicity and time required to perform installation or replacement of the institutional telephone system. In addition, owing to the ease of installation and lack of a physical network interface requirement that is afforded by the system, telephone service providers are able to install or demonstrate a live example of an actual product to potential customers with a minimum of effort.

One exemplary device includes a connection panel, a network router, and an access and security module at least partially enclosed within a portable enclosure. The portable enclosure may comprises wheels for rolling the enclosure on underlying floor surfaces. The enclosure size can vary depending on intended application and components included. For example, a portable enclosure could enclose an area from less than 1 ft$^3$ to 200 ft$^3$, or even larger. In one example, the portable enclosure may enclose the connection panel, the network router, and access and security module within a space of equal to or less than 24 cubic feet, for example, by providing a rectangular container with the following dimensions in inches: 23 (L)×23 (W)×19 (H). This would allow enough space to hook up 24 telephone handsets. In another example, an enclosure configured to hold three Voice of IP (VoIP) gateways in addition to other appropriate equipment could have the following dimensions in inches: 23(L)×23 (W)×24(H). Such a configuration could allow hooking up 72 telephone handsets. The particular configuration and size of the enclosure can be configured to suit the particular application(s) for which the device is designed.

The term "portable" is used herein to refer to any device that is capable of being relocated as a single unit. Devices of any size can be portable.

The connection panel may be configured to accept a removable connection to one or more telephones of a controlled access residential institution.

The network router may be connected to the connection panel and configured to connect to a remote network. The network router may be configured to connect wirelessly to the remote network, configured to connect to the remote network via a wired connection available at the controlled access residential institution, or may be configured to both connect wirelessly to the remote network and configured to connect to the remote network via a wired connection available at the controlled access residential institution.

The access and security module may be connected to the network router and configured to control access by the telephone to telephone services provided by accessing a remote call processing center via the remote network. The telephone services may involve connecting and/or monitoring a call between the telephone at the controlled access residential institution and a telephone at a remote location. The telephone services may involve authenticating a called party before or during a call between the telephone at the controlled access residential institution and a telephone at a remote location.

The device may further include a power distribution unit within the enclosure and connected to provide power to the network router and to the access and security module. The power distribution unit may comprise a power cord for connecting to and receiving power from a power outlet at the controlled access residential institution.

The device may further include a voice over Internet protocol (VoIP) gateway for converting analog signals received from the telephone of the controlled access residential institution.

The device may further comprise a wireless local area network component for wirelessly connecting to a wireless communication device at the controlled access residential institution to allow the wireless communication device to access resources on the network subject to control by the remote call processing center.

In accordance with yet another aspect of illustrative embodiments, interfaces are provided which facilitate connectivity to a traditional physical network interface via Category 5 based Ethernet connections. In this embodiment, the physical network interface may be utilized as either the primary or as the secondary network connection in a configuration which provides for redundant network connections featuring optional automated failover from the primary network interface to the secondary network interface in the event of a failure within the primary network interface. In addition, the physical Ethernet-based network connection may be utilized in a singular fashion in embodiments which do not feature redundant network connections.

In accordance with yet another aspect of illustrative embodiments, systems and methods are provided which enable the incorporation of local wireless devices into the telecommunications system in order to expand functionality and features beyond what have traditionally been available through the use of basic analog telephone handsets. Such wireless devices may include, but are not limited to, tablet computers, so-called "smart" cellular telephones, laptop computers, and portable music players. Incorporation of these devices into the telecommunications system may be facilitated by the use of an included local-area wireless communication hardware component and may utilize any of a number of wireless data protocols, including but not limited to the well-known 802.11 Ethernet standard.

Figure 3:
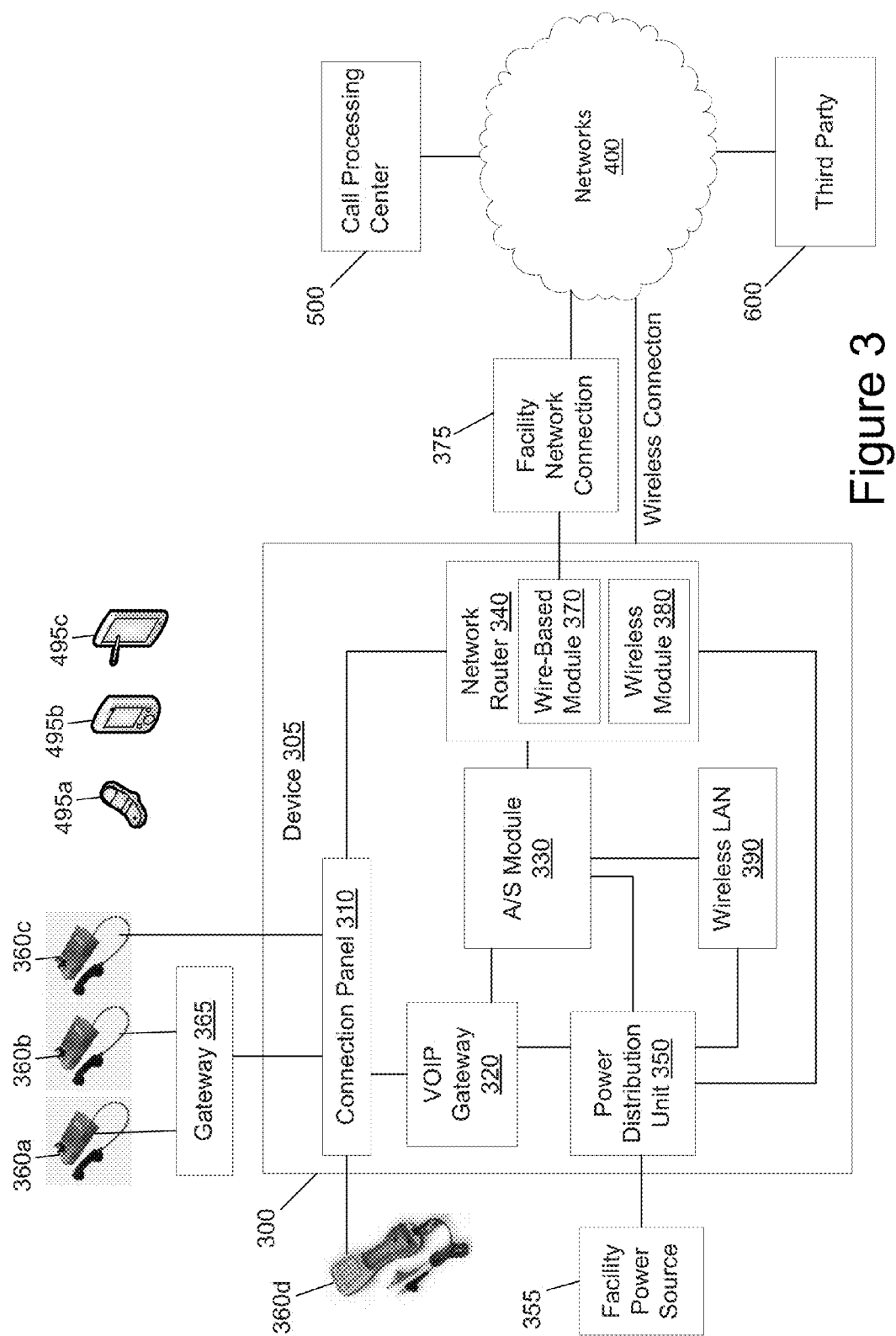
FIG. 3 is a diagram illustrating a portable enclosure according to an embodiment of the present invention.

FIG. 3 is a diagram illustrating a portable enclosure according to an embodiment of the present invention. Embodiments of the invention may differ with respect to including fewer, more, and/or differing components to provide similar and/or differing functionalities.

In FIG. 3, device 305 is provided in a self-contained portable enclosure 300 and combines connection panel 310, a VoIP gateway 320, an access and security module 330, a network router 340, a power distribution unit 350, and a wireless local area network (LAN) component 390 into a single pre-wired enclosure 300. The device 305 can be configured away from the location(s) at which it is later deployed. For example, at a service provider's facility, such a device can be assembled with the one or more wire connections established to provide information and/or power channels between one or more of the connection panel 310, the VoIP gateway 320, the access and security module 330, the network router 340, the power distribution unit 350, and/or the wireless local area network (LAN) component 390 into a single pre-wired enclosure 300.

After being assembled at the service provider's facility, the enclosure 300 can be transported, for example, in a vehicle such as car, van, truck, or airplane to an institution at which it is deployed. The enclosure 300 may be carried and/or wheeled from the vehicle to the an appropriate location within the institution. Device 305 may be deployed at a location either internally or externally to an equipment room at a residential institution. Device 305 may then be quickly and easily attached to any appropriate residential institution connections. For example, the device 305 may be attached to a power source and one or more local telephone devices at the residential institution. Transporting and deploying the device 305 may require significantly less time and effort than installing a permanent system of separate components that are not pre-wired, not easily transported, and not otherwise configured to simplify connection with appropriate residential institution devices.

In one embodiment, connectivity to one or more resident telephone handsets 360a-c is facilitated by connection panel 310. Resident telephone handsets 360a-c connect directly or indirectly to the connection panel 310. In the embodiment of FIG. 3, resident telephone handsets 360a-b are analog or digital devices connected by connecting a gateway 365 to the connection panel 310. The gateway 365 may convert the analog phone signals to digital phone signals that are received by the connection panel or vice versa. Resident telephone handsets may additionally or alternatively connect directly to the connection panel 310 as illustrated by telephone handset 360c connecting directly to connection panel 310. One or more non-facility devices, such as test telephone handset 360d may additionally or alternatively be connected to connection panel 310. However connected, ultimately telephone handsets 360a-d connect to the device 305 and through the device access telecommunications services provided by, monitored by, and/or controlled by remote call processing center 500. For example, device 360a may call a third party 600.

Within the device 305, VoIP gateway 320 may be used to convert analog signals to digital signals and/vice versa to facilitate such communication. For example, if telephone handset 360c is an analog device, VoIP gateway 320 may convert the analog signals coming from handset 360c to digital signals for transmission to the remote call processing center 500 over one or more digital networks 400 and conversely may convert digital signals received from such one or more digital networks 400 to analog signals to be provided back to handset 360c. VoIP gateway 320 can be wired (and is preferably prewired) to access and security module 330, connection panel 310, and/or any other appropriate components of device 305 to communicate information signals.

The phrase "wired" as used herein refers to any temporary, removable, plug-based or non-plug-based, or non-temporary communication cables or other wire-based connection established between two or more components. "Wired" may refer to a connection by wires used to communicate information signals (digital or analog) and/or by wires used to provide power. Components that are "wired" together can be, but need not be, integrated into a single combined component.

The phrase "prewired" is used to refer to components wired prior to transport and/or deployment to a facility at which the components will function together as part of a device.

Network connectivity can involve any suitable communication mechanism and/or network type. Network router 340 can control and/or facilitate such network connectivity. Network router 340 can be wired (and is preferably prewired) to connection panel 310, access and security module 330, and/or any other appropriate components of device 305 to communicate information signals.

In one embodiment, connectivity to a wide area packet-based data network via network router 340 is facilitated by communications between a wireless module 380 and remote wireless network communications tower (not shown) of the one or more networks 400. In another embodiment wire-based module 370 is used to connect via a wired connection to the one or more networks 400. In the example of FIG. 3, the wire-based module 370 of device 305 is plugged into an existing facility network connection 375 by connecting a network wire between the two. The device 305 may then use the residential institution's existing facility network connection 375 to access the one or more networks 400. Device 305 may include only a wire-based module 370, only a wireless module 380, or both a wire-based module 370 and a wireless module 380. For example, both a wire-based module 370 and a wireless module 380 may be included to provide backup connectivity. If the wire-based connectivity is not available or fails, the wireless connectivity can be used as a backup. In one embodiment, an additional hardware-based network connection is facilitated by a Category 5 compatible connection, and may be utilized either as a primary or as a secondary network connection.

Access and security module 330 can facilitate secure access to the call processing center 500, for example, by establishing and/or controlling a virtual private network (VPN) connection with the call processing center 500. Access and security module 330 can be configured (and is preferably preconfigured) to automatically establish a VPN connection to the call processing center 500 upon power being applied to the device 305. Access and security module 330 can be wired (and is preferably prewired) to network router 340 to communicate information signals. Access and security module 330 can act as a firewall that acts as a barrier designated to prevent unauthorized or unwanted communications with device 305 from the one or more networks 400. The network router 340 can be configured to pass all received network traffic through the access and security module 330 to protect device 305 and any devices accessing networks 400 through device 305. Access and security module 330 can be wired (and is preferably prewired) to network router 340 and/or any other appropriate components of device 305 to communicate information signals.

Wireless local area network (LAN) component 390 is included in device 305 to provide connectivity to local wireless communication devices 495a-c. Exemplary devices include portable phones, tablet computer devices, laptop computer devices, desktop computer devices, server computer devices, and any other devices configured to communicate via a LAN. Such communication may use, for example, 802.11 communication protocol. Wireless LAN component 390 can be wired (and is preferably prewired) to access and security module 330 and/or any other appropriate components of device 305 to communicate information signals.

Power distribution unit 350 of device 305 may have a cord that extends to plug into or otherwise connect to a facility power source 355. Power distribution unit 350 is wired (and is preferably prewired) to VoIP gateway 320, access and security module 330, network router 340, wireless LAN module 390, and/or to any other appropriate components of device 305 to provide power to such components.

Figure 4:
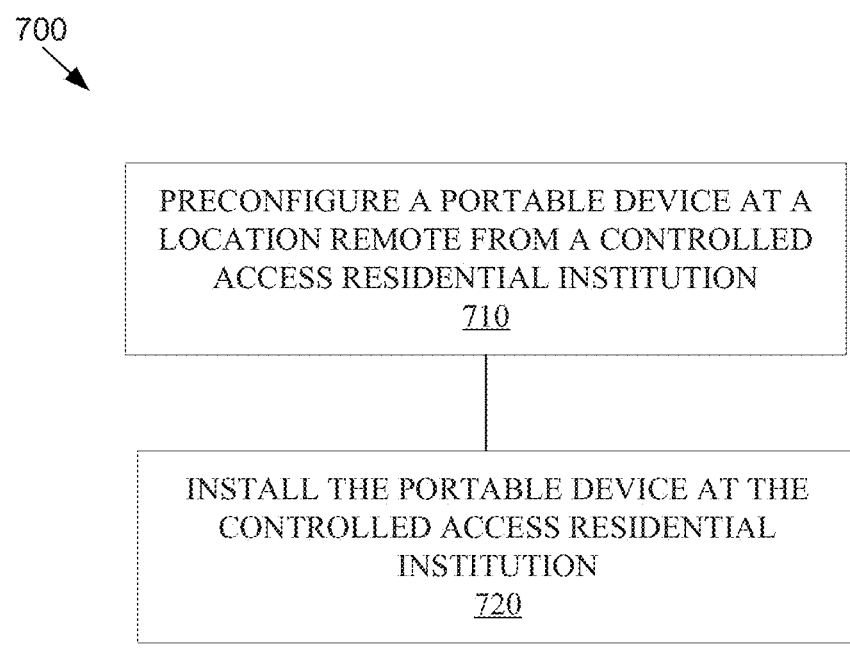
FIG. 4 is a flow chart illustrating a method of using a portable system.

FIG. 4 is a flow chart illustrating a method 700 of using a portable system. Such a method 700 may be used to facilitate replacement of an existing system, to address a network outage or other problem at a facility, to demonstrate the capabilities of a new or modified system, and in a variety of other circumstances.

The method 700, as shown in block 710, involves preconfiguring a portable device at a location remote from a controlled access residential institution, such as a prison, detention center, hospital, school, military base, office complex, etc. Preconfiguring the portable device may involve configuring the device to have a connection module configured to connect to a handset telephone or other electronic communication device via a wireless or wired connection, a network router prewired to the connection module and configured to connect to a remote network, and an access and security module prewired to the network router and configured to control access by the electronic communication device to services provided by accessing a remote call processing center via the remote network. Additional and/or alternative components may be included and prewired including but not limited to components illustrated in FIG. 3.

The method 700, as shown in block 720, further involves installing the portable device at the controlled access residential institution. The portable device may be installed to allow a handset telephone or other electronic communication device at the controlled access residential institution to access the services provided by accessing the remote call processing center via the remote network. Installing the portable device at the controlled access residential institution may involve connecting the portable device via one or more wires to a power outlet, a wire-based facility network connection, and/or to one or more handset or other electronic communication devices at the controlled access residential institution.

Figure 5:
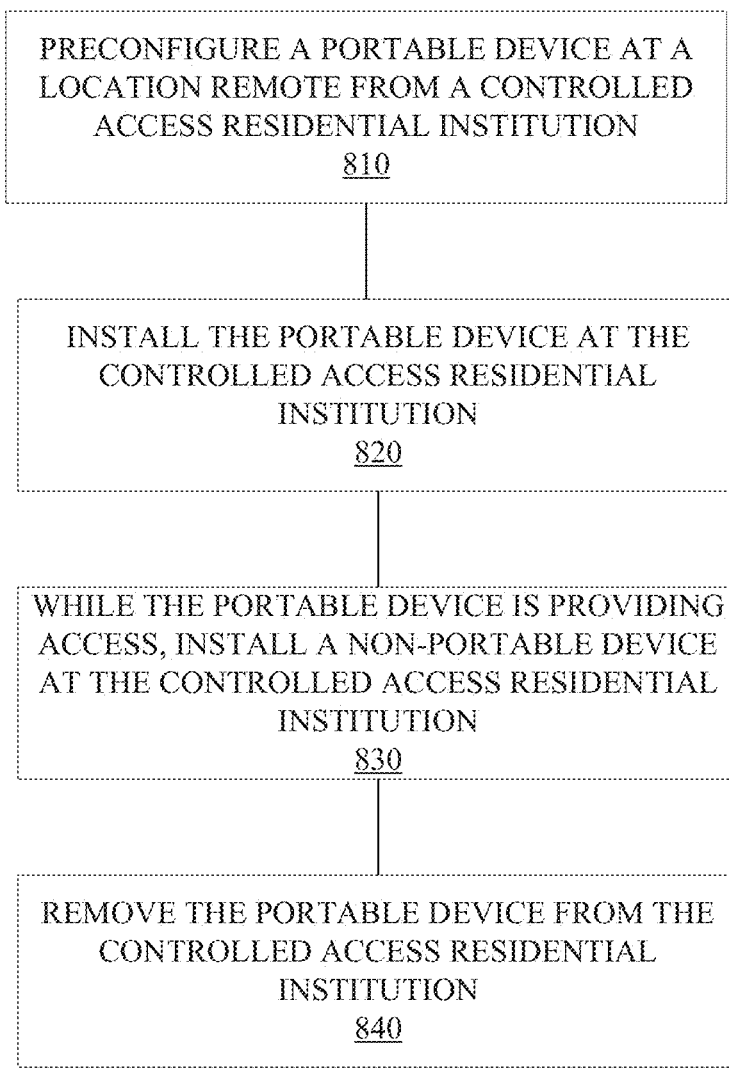
FIG. 5 is a flow chart illustrating a method of using a portable system while a non-portable system is being installed.

FIG. 5 is a flow chart illustrating a method 800 of using a portable system while a non-portable system is being installed. Such a method 700 may be used to facilitate replacement of an existing system and in a variety of other circumstances.

The method 800, as shown in block 810, involves preconfiguring a portable device at a location remote from a controlled access residential institution, such as a prison, detention center, hospital, school, military base, office complex, etc. Preconfiguring the portable device may involve configuring the device to have a connection module configured to connect to a handset telephone or other electronic communication device via a wireless or wired connection, a network router prewired to the connection module and configured to connect to a remote network, and an access and security module prewired to the network router and configured to control access by the electronic communication device to services provided by accessing a remote call processing center via the remote network. Additional and/or alternative components may be included and prewired including but not limited to components illustrated in FIG. 3.

The method 800, as shown in block 820, further involves installing the portable device at the controlled access residential institution. The portable device may be installed to allow a handset telephone or other electronic communication device at the controlled access residential institution to access the services provided by accessing the remote call processing center via the remote network.

The method 800, as shown in block 830, further involves, while the portable device is providing access, installing a non-portable device at the controlled access residential institution. Installing the non-portable device may involve installing the non-portable device to provide access by one or more telephone handsets or other electronic communication devices at the controlled access residential institution to the services provided remote call processing center via the remote network.

The method 800, as shown in block 840, further involves removing the portable device from the controlled access residential institution. Thus, after installing the non-portable device, the portable device can be relocated, as examples, back to a service provider facility or to a different controlled access residential institution.

The foregoing description and summary of the invention are to be understood as being in every respect illustrative and exemplary, but not restrictive, and the scope of the invention disclosed herein is not to be determined only from the detailed description of illustrative embodiments but according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A device comprising:
   a connection panel configured to accept a removable connection to multiple telephones of a controlled access residential institution;
   a network router connected to the connection panel and configured to connect to a remote network; and
   an access and security module connected to the network router and configured to control access by the telephone to telephone services provided by accessing a remote call processing center via the remote network, wherein the access and security module is configured to establish and control a virtual private network (VPN) connection with the call processing center; and
   wherein the connection panel, the network router, and access and security module are at least partially enclosed within a portable enclosure, wherein the device is configured to be installed and connected without hard wiring and without mounting and to be relocated as a single unit,
   wherein the device is configured for:
   providing access by one or more electronic communication devices at the controlled access residential institution to the services provided by accessing the remote call processing center via the remote network while a non-portable device is installed to provide access by the one or more electronic communication devices at the controlled access residential institution to the services provided by accessing the remote call processing center via the remote network; and
   removal from the controlled access residential Institution after Installation of the non-portable device.

2. The device of claim 1 further comprising a power distribution unit within the enclosure and connected to provide power to the network router and to the access and security module.

3. The device of claim 1 wherein the power distribution unit comprises a power cord for connecting to and receiving power from a power outlet at the controlled access residential institution.

4. The device of claim 1 wherein the portable enclosure comprises wheels for rolling the enclosure on underlying floor surfaces.

5. The device of claim 1 wherein the portable enclosure encloses the connection panel, the network router, and access and security module within a space of equal to or less than 24 cubic feet.

6. The device of claim 1 wherein the network router is configured to connect wirelessly to the remote network.

7. The device of claim 1 wherein the network router is configured to connect to the remote network via a wired connection available at the controlled access residential institution.

8. The device of claim 1 wherein the network router is configured to connect wirelessly to the remote network and configured to connect to the remote network via a wired connection available at the controlled access residential institution.

9. The device of claim 1 further comprising a voice over Internet protocol (VoIP) gateway for converting analog signals received from the telephone of the controlled access residential institution.

10. The device of claim 1 further comprising a wireless local area network component for wirelessly connecting to a wireless communication device at the controlled access residential institution to allow the wireless communication device to access resources on the network subject to control by the remote call processing center.

11. The device of claim 1 wherein the telephone services provided by accessing the remote call processing center via the remote network comprise connecting and monitoring a call between the telephone at the controlled access residential institution and a telephone at a remote location.

12. The device of claim 1 wherein the telephone services provided by accessing the remote call processing center via the remote network comprise authenticating a called party before or during a call between the telephone at the controlled access residential institution and a telephone at a remote location.

13. The device of claim 1 wherein the access and security module is a firewall.

14. A method comprising:
   preconfiguring a portable device at a location remote from a controlled access residential institution, wherein the preconfigured portable device comprises:
   a connection module configured to connect to an electronic communication device via a wireless or wired connection;
   a network router prewired to the connection module and configured to connect to a remote network; and
   an access and security module prewired to the network router and configured to control access by the electronic communication device to services provided by accessing a remote call processing center via the remote network, wherein the access and security module is configured to establish and control a virtual private network (VPN) connection with the call processing center;

installing the portable device at the controlled access residential institution to allow the electronic communication device at the controlled access residential institution to access the services provided by accessing the remote call processing center via the remote network, wherein the device is installed and connected without hard wiring and without mounting, the device capable of being relocated as a single unit; and while the portable device is providing access by one or more electronic communication devices at the controlled access residential institution to the services provided by accessing the remote call processing center via the remote network, installing a non-portable device configured to provide access by the one or more electronic communication devices at the controlled access residential institution to the services provided by accessing the remote call processing center via the remote network; and removing the portable device from the controlled access residential institution after installing the non-portable device.

15. The method of claim 14 wherein installing the portable device at the controlled access residential institution comprises connecting the portable device to a power outlet at the controlled access residential institution.

16. A device comprising:

a connection module configured to connect to an electronic communication device via a wireless or wired connection;

a network router prewired to the connection module and configured to connect to a remote network;

an access and security module prewired to the network router and configured to control access by the electronic communication device to services provided by accessing a remote call processing center via the remote network, wherein the access and security module is configured to establish and control a virtual private network (VPN) connection with the call processing center; and a power distribution unit prewired to provide power to the network router and to the access and security module;

wherein the connection panel, the network router, access and security module, and power distribution unit are at least partially enclosed within a portable enclosure, wherein the device is configured to be installed and connected without hard wiring and without mounting and to be relocated as a single unit; and wherein the device is configured for:

providing access by one or more electronic communication devices at the controlled access residential institution to the services provided by accessing the remote call processing center via the remote network while a non-portable device is installed to provide access by the one or more electronic communication devices at the controlled access residential institution to the services provided by accessing the remote call processing center via the remote network; and removal from the controlled access residential institution after installation of the non-portable device.

17. The device of claim 16 wherein the power distribution unit comprises a power cord for connecting to and receiving power from a power outlet at the controlled access residential institution.

18. The device of claim 16 wherein the portable enclosure comprises wheels for rolling the enclosure on underlying floor surfaces.

19. The device of claim 16 wherein the network router is configured to connect wirelessly to the remote network.

* * * * *